INVENTOR.
Paul C. Patchan
BY Victor J. Evans & Co.
ATTORNEYS

July 31, 1956  P. C. PATCHAN  2,756,730
WATER COOLER AND HOT AIR INTAKE ASSEMBLY
Filed Aug. 12, 1954  2 Sheets-Sheet 2
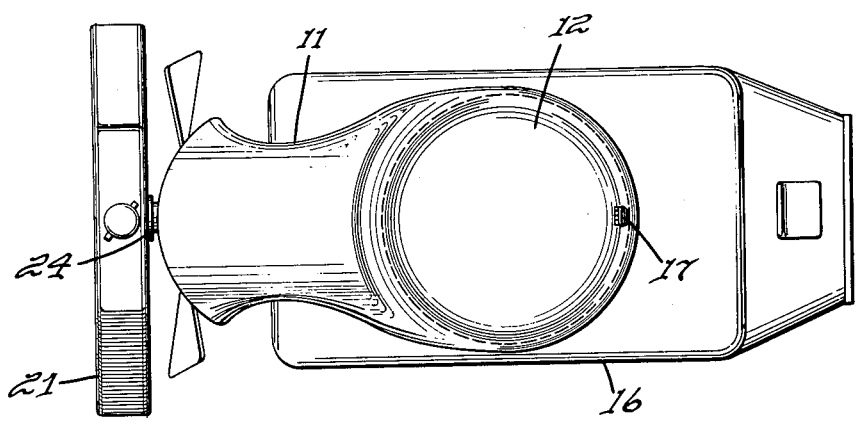
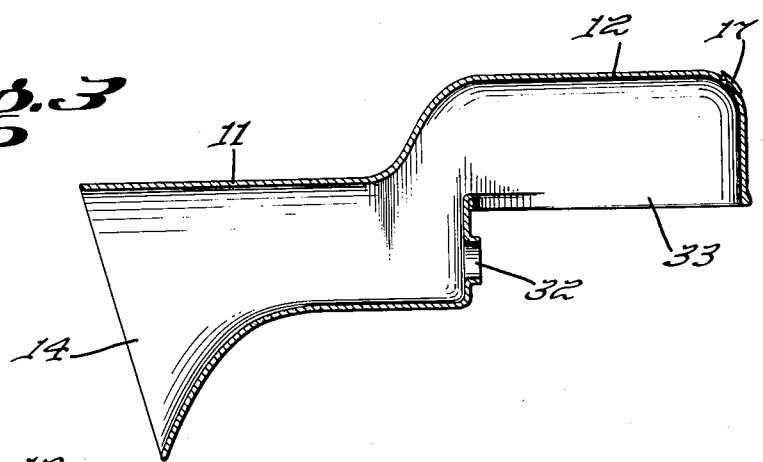
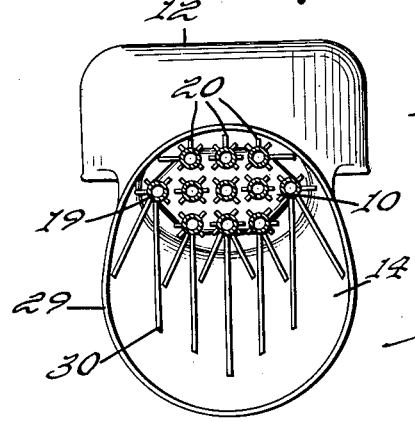
INVENTOR.
Paul C. Patchan
BY Victor J. Evans & Co.
ATTORNEYS

United States Patent Office 2,756,730
Patented July 31, 1956

2,756,730

WATER COOLER AND HOT AIR INTAKE ASSEMBLY

Paul C. Patchan, Defense Heights, Md.

Application August 12, 1954, Serial No. 449,320

2 Claims. (Cl. 123—41.51)

This invention relates to heat-exchanging devices used in combination with internal combustion engines, and in particular, a radiator or water cooler positioned in a path of air flowing from a fan at the forward end of an engine through a casing to the air cleaner or filter above the carburetor of the engine whereby air entering the air cleaner is heated by hot water fom the water jacket of the engine and the heat is extracted from water passing to the radiator or back to the engine, the water being cooled thereby.

The purpose of this invention is to utilize the heat extracted from water of a cooling system of an internal combustion engine for raising the temperature of air supplied to the carburetor of the engine.

Various attempts have been made to raise the temperature of fuel passing through a carburetor to the cylinders of an internal combustion engine and various types of radiators have been provided for removing heat from cooling water from the water jacket of an engine. With this thought in mind, this invention contemplates utilizing the cooling agent for extracting heat from the cooling water of an internal combustion engine for raising the temperature of the fuel by cooling the water with air and using the air in the carburetor whereby fuel is mixed with heated air which vaporizes gases more completely and the vaporized fuel which burns more evenly and efficiently provides increased power with a comparatively lean mixture and consequently greater mileage with less fuel.

The object of this invention is, therefore, to provide means for utilizing air used to cool water from a water jacket of an internal combustion engine for supplying heat to fuel passing through a carburetor of the engine to cylinders thereof.

Another object of the invention is to provide a heat exchanger for removing heat from water of a water jacket of an internal combustion engine and using the heat for raising the temperature of the fuel in which the surface area of the heat exchanger or radiator is increased.

A further object of the invention is to provide an improved heat exchanger for cooling water flowing from a water jacket of an internal combustion engine with air and using the air for raising the temperature of fuel passing to cylinders of the engine in which the device is of a simple and economical construction.

With these and other objects and advantages in view, the invention embodies a network of tubes having fins extended from outer surfaces thereof with means for harnessing air from a fan at the forward end of an internal combustion engine whereby the air travels through the network of tubes, contacting the fins for removing heat units therefrom and in which the heated air is directed into the air cleaner or filter of the engine.

Other features and advantages of the invention will appear from the following description taken in connection with the drawings, wherein:

Figure 2 is a plan view of the improved heat exchanger showing the device positioned upon an engine, the engine body, radiator, and fan being conventional.

Figure 3 is a longitudinal section through a casing in which the heat exchanger of this invention is incorporated.

Figure 4 is an end elevational view of the heat exchanger taken substantially on line 4—4 of Figure 1.

Figure 1:
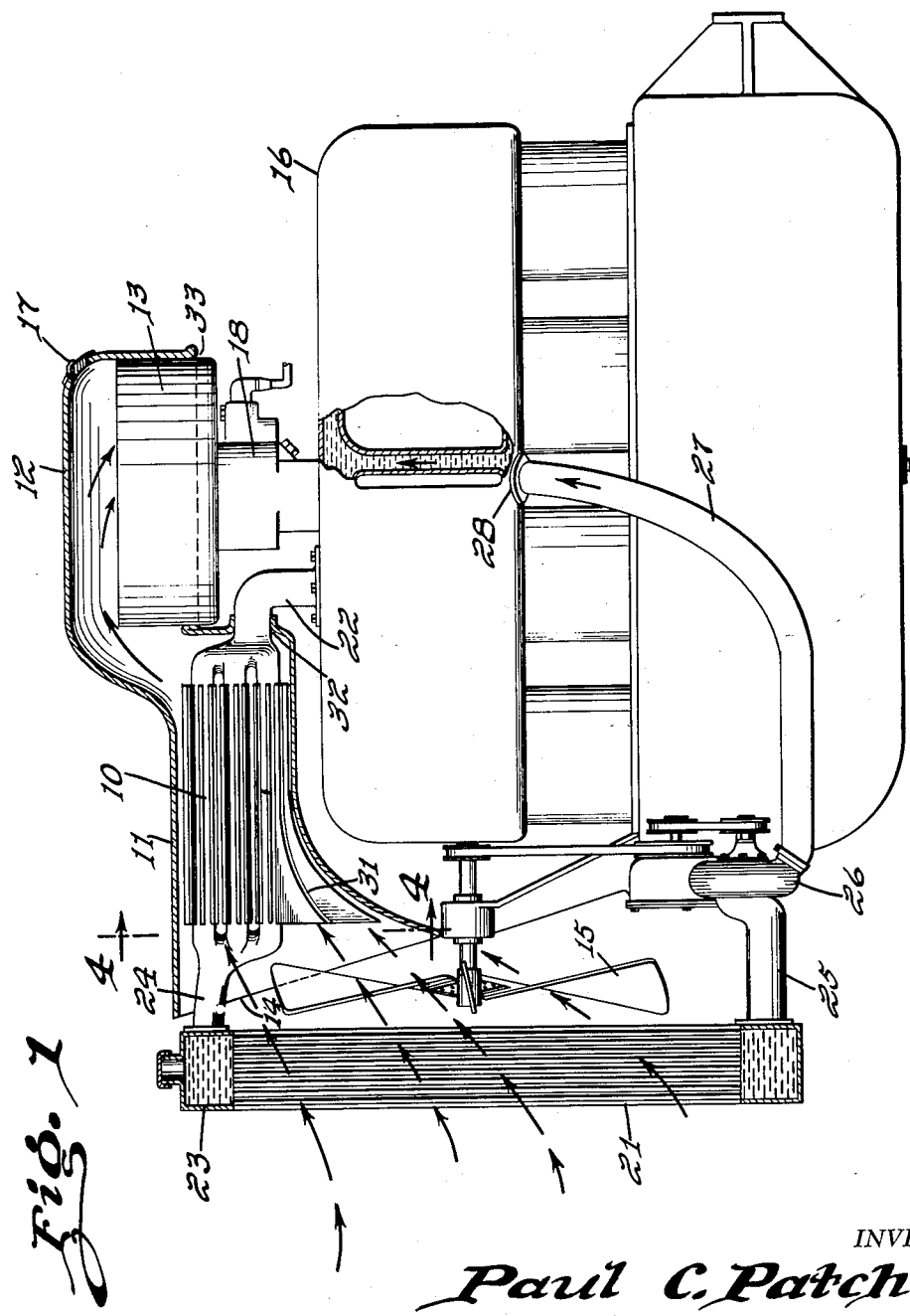
Figure 1 is a longitudinal section through the improved heat exchanger showing the device mounted on a conventional internal combustion engine with the device positioned to receive air from a fan at the forward end of the engine and with a casing surrounding the device directing the air into an air cleaner or filter of the engine, the engine and filter being conventional.

Referring now to the drawings wherein like reference characters denote corresponding parts, the improved water cooler and hot air intake device of this invention includes a heat exchanger 10 and a casing having a section 11 in which the heat exchanger is positioned, a hood 12 adapted to be positioned over an air filter 13, and an open or intake end 14 providing a mouth through which air is driven by a fan 15 of an engine 16 whereby air from the upper part of the fan passes through the section 11 of the casing around the heat-exchanging element 10 and into the upper end of the air filter 13. The rear end of the hood 12 is provided with an opening 17 providing an air valve to permit escape of surplus air whereby only the amount of air desired passes downwardly through the filter 13 to a carburetor 18.

The heat exchanger 10 which, as illustrated in Figure 4, is formed with a network of tubes 19 having radially disposed fins 20 thereon may be in the form of a conventional radiator of the honeycomb type or may be provided in various designs and the size may be increased so that it will efficiently cool water from the water jacket of the engine and with the heat exchanger having sufficient capacity to cool the water the conventional radiator, as indicated by the numeral 21, may be omitted.

As illustrated in Figure 1, the tubes of the heat exchanger 10 are connected to the water jacket of the engine with a pipe 22 and to the upper end 23 of the radiator 21 with a pipe connection or tube 24. The lower end of the radiator 21 is connected by a tube 25 to a conventional water pump 26 and the discharge of the water pump is connected by a tube 27 in the water jacket at a point 28.

The fan 15 is mounted on the forward end of the engine by conventional means, and it will be understood that the fan may be positioned to drive a greater quantity or volume of air into the heat exchanger 10, and it will also be understood that a fan or blower of a different type may be used.

As illustrated in Figure 4, the mouth or intake end of the casing, which is generally indicated by the numeral 29, is provided with spaced vertically disposed webs 30 whereby air supplied by the fan 15 may be evenly distributed through the heat-exchanging coils or tubes. The device may also be provided with transversely disposed webs, as indicated by the numeral 31, in Figure 1, and guiding elements of different types and designs may be used.

The section 11 of the casing is provided with an opening 32 through which the pipe 22 extends and the lower part of the hood 12 is provided with an opening 33 that is adapted to receive the air filter 13.

It will be understood that the casing is adapted to be patterned to correspond with different types of engines, and the connections to the water jacket and filter are adapted to be changed accordingly.

By this means water used in the cooling system of the engine supplies heat to air passing to the air filter and the heat extracted from the water is utilized to raise the temperature of the fuel.

By this means fuel passing through the carburetor is heated, providing more efficient vaporization, increasing the power of the engine, and reducing the quantity of fuel required by the engine.

By increasing the surface area of the elements of the heat exchanger, the water may be cooled to any desired temperature.

It will be understood that modifications, within the scope of the appended claims, may be made in the design and arrangement of the parts without departing from the spirit of the invention.

What is claimed is:

1. In a water cooler and air heater for use in combination with an internal combustion engine, the combination which comprises a radiator connected to the engine, a fan for the engine positioned adjacent said radiator, a water jacket for the engine, and an air filter, a connection from one end of the radiator to the outlet side of the water jacket of the engine, a connection from the opposite end of the radiator to the inlet connection of the water jacket of the engine, a pump in one of said connections, a casing surrounding said radiator, said casing having a downwardly flared air intake end extending over the fan and positioned to receive air from the fan of the engine, and a hood extended from the opposite end of the casing and postioned to guide air from the radiator to the air filter of the engine.

2. In a water cooler and air heater for use in combination with an internal combustion engine, the combination which comprises a radiator connected to the engine, a fan for the engine positioned adjacent said radiator, a water jacket for the engine, and an air filter, a connection from one end of the radiator to the outlet side of the water jacket of the engine, a connection from the opposite end of the radiator to the inlet connection of the water jacket of the engine, a pump in one of said connections, a casing surrounding said radiator, said casing having a downwardly flared air intake end extending over the fan and positioned to receive air from the fan of the engine, and a hood extended from the opposite end of the casing and positioned to guide air from the radiator to the air filter of the engine, said casing having an outlet opening for the escape of surplus air.

References Cited in the file of this patent
UNITED STATES PATENTS

| | | |
|---|---|---|
| 1,347,043 | Justice et al. | July 20, 1920 |
| 1,443,859 | Allen et al. | Jan. 30, 1923 |
| 2,197,503 | Martin | Apr. 16, 1940 |
| 2,369,937 | Baster | Feb. 20, 1945 |